US010884471B2

(12) United States Patent
Eastep et al.

(10) Patent No.: US 10,884,471 B2
(45) Date of Patent: *Jan. 5, 2021

(54) HOLISTIC GLOBAL PERFORMANCE AND POWER MANAGEMENT

(71) Applicant: Intel Corporation, Santa Clara, CA (US)

(72) Inventors: Jonathan M. Eastep, Portland, OR (US); Richard J. Greco, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/162,303

(22) Filed: Oct. 16, 2018

(65) Prior Publication Data

US 2019/0121414 A1     Apr. 25, 2019

Related U.S. Application Data

(63) Continuation of application No. 14/580,150, filed on Dec. 22, 2014, now Pat. No. 10,101,786.

(51) Int. Cl.
*G06F 1/3203* (2019.01)
*G06F 9/48* (2006.01)
(Continued)

(52) U.S. Cl.
CPC ............ *G06F 1/3203* (2013.01); *G06F 1/329* (2013.01); *G06F 9/4881* (2013.01);
(Continued)

(58) Field of Classification Search
None
See application file for complete search history.

(56) References Cited

U.S. PATENT DOCUMENTS 6,408,395 B1   6/2002  Sugahara et al.
6,442,669 B2   8/2002  Wright et al.
(Continued)

FOREIGN PATENT DOCUMENTS

CN        1902577 A       1/2007
CN      102427230 A       4/2012
(Continued)

OTHER PUBLICATIONS

Theocharous, et al., "Machine Learning for Adaptive Power Management", 2006, Intel Technology Journal, vol. 10, Issue 4, pp. 299-310. (Year: 2006).*
(Continued)

*Primary Examiner* — Qing Yuan Wu
(74) *Attorney, Agent, or Firm* — Spectrum IP Law Group LLC

(57) ABSTRACT

Methods and apparatus to provide holistic global performance and power management are described. In an embodiment, logic (e.g., coupled to each compute node of a plurality of compute nodes) causes determination of a policy for power and performance management across the plurality of compute nodes. The policy is coordinated across the plurality of compute nodes to manage a job to one or more objective functions, where the job includes a plurality of tasks that are to run concurrently on the plurality of compute nodes. Other embodiments are also disclosed and claimed.

20 Claims, 6 Drawing Sheets

(51) Int. Cl.
*G06F 9/50* (2006.01)
*G06N 20/00* (2019.01)
*G06F 1/329* (2019.01)
*G06F 9/38* (2018.01)
*G06F 9/52* (2006.01)

(52) U.S. Cl.
CPC .......... *G06F 9/4893* (2013.01); *G06F 9/5094* (2013.01); *G06N 20/00* (2019.01); *G06F 9/38* (2013.01); *G06F 9/50* (2013.01); *G06F 9/505* (2013.01); *G06F 9/522* (2013.01)

(56) References Cited

U.S. PATENT DOCUMENTS

| | | |
|---|---|---|
| 6,601,084 B1 | 7/2003 | Bhaskaran et al. |
| 6,704,877 B2 | 3/2004 | Cline et al. |
| 6,711,691 B1 | 3/2004 | Howard et al. |
| 6,748,222 B1 | 6/2004 | Hashem et al. |
| 6,859,882 B2 | 2/2005 | Fung |
| 7,051,215 B2 | 5/2006 | Zimmer et al. |
| 7,102,556 B2 | 9/2006 | White |
| 7,143,300 B2 | 11/2006 | Potter et al. |
| 7,602,874 B2 | 10/2009 | Hilgendorf et al. |
| 7,916,676 B2 * | 3/2011 | Elzur ..................... H04L 12/12 370/311 |
| 8,010,815 B2 | 8/2011 | Hamilton et al. |
| 8,301,742 B2 | 10/2012 | Hanson et al. |
| 8,327,187 B1 | 12/2012 | Metcalf |
| 9,477,533 B2 | 10/2016 | Eastep et al. |
| 9,811,143 B2 | 11/2017 | Eastep et al. |
| 10,101,786 B2 | 10/2018 | Eastep et al. |
| 2003/0023885 A1 | 1/2003 | Potter et al. |
| 2003/0079151 A1 | 4/2003 | Bohrer et al. |
| 2003/0145041 A1 | 7/2003 | Dunham et al. |
| 2005/0160133 A1 | 7/2005 | Greenlee et al. |
| 2006/0212868 A1 | 9/2006 | Takayama et al. |
| 2006/0218423 A1 | 9/2006 | Diefenbaugh et al. |
| 2006/0294400 A1 | 12/2006 | Diefenbaugh et al. |
| 2008/0109811 A1 | 5/2008 | Krauthgamer et al. |
| 2008/0127145 A1 | 5/2008 | So et al. |
| 2008/0301474 A1 | 12/2008 | Bussan et al. |
| 2009/0083390 A1 | 3/2009 | Abu-Ghazaleh et al. |
| 2009/0138737 A1 | 5/2009 | Kim et al. |
| 2010/0306781 A1 | 12/2010 | Loboz et al. |
| 2011/0055838 A1 | 3/2011 | Moyes |
| 2011/0161696 A1 | 6/2011 | Fletcher |
| 2011/0289507 A1 | 11/2011 | Khan et al. |
| 2011/0307716 A1 | 12/2011 | Diab |
| 2012/0084028 A1 | 4/2012 | Kumar et al. |
| 2012/0185706 A1 | 7/2012 | Sistla et al. |
| 2012/0260117 A1 | 10/2012 | Acar et al. |
| 2012/0324248 A1 | 12/2012 | Schluessler et al. |
| 2013/0024710 A1 | 1/2013 | Jackson |
| 2013/0061064 A1 | 3/2013 | Ananthakrishnan et al. |
| 2013/0097443 A1 | 4/2013 | Li et al. |
| 2013/0103929 A1 | 4/2013 | Ballew et al. |
| 2013/0111425 A1 | 5/2013 | Kumar et al. |
| 2013/0145379 A1 | 6/2013 | Faraj et al. |
| 2013/0283277 A1 | 10/2013 | Cai et al. |
| 2013/0318334 A1 | 11/2013 | Waskiewicz, Jr. |
| 2013/0346969 A1 | 12/2013 | Shanmuganathan et al. |
| 2013/0346997 A1 | 12/2013 | Blocksome et al. |
| 2014/0053163 A1 | 2/2014 | Yamauchi et al. |
| 2014/0082377 A1 | 3/2014 | Dinh et al. |
| 2014/0082380 A1 | 3/2014 | Schluessler et al. |
| 2014/0136857 A1 | 5/2014 | Jacobson et al. |
| 2014/0181545 A1 | 6/2014 | Shall et al. |
| 2014/0189398 A1 | 7/2014 | Gorbatov et al. |
| 2014/0359310 A1 | 12/2014 | Haridass et al. |
| 2015/0089254 A1 | 3/2015 | Burns et al. |
| 2015/0121105 A1 | 4/2015 | Seon et al. |
| 2015/0177798 A1 | 6/2015 | Venishetti et al. |
| 2016/0179162 A1 | 6/2016 | Eastep et al. |
| 2016/0179167 A1 | 6/2016 | Yeo et al. |
| 2016/0179173 A1 | 6/2016 | Eastep et al. |
| 2016/0187944 A1 | 6/2016 | Eastep et al. |
| 2016/0188380 A1 | 6/2016 | Eastep et al. |

FOREIGN PATENT DOCUMENTS

| | | |
|---|---|---|
| CN | 103384372 A | 11/2013 |
| CN | 107003901 A | 8/2017 |
| EP | 3238002 A1 | 11/2017 |
| JP | 2005115939 A | 4/2005 |
| JP | 20011034403 A | 2/2011 |
| JP | 2014186522 A | 10/2014 |
| JP | 2014527248 A | 10/2014 |
| TW | 1406121 A | 8/2013 |
| WO | 2013030860 A1 | 3/2013 |
| WO | 2015016947 A1 | 5/2015 |
| WO | 2016/105791 A1 | 6/2016 |

OTHER PUBLICATIONS

Tan, et al., "A Framework of Stochastic Power Management Using Hidden Markov Model", 2008, EDAA, pp. 92-97. (Year: 2008).*
Extended European Search Report received for European Patent Application No. 15873996.1 dated Aug. 1, 2018, 9 pages.
Talcott, et al., "Policy-Based Coordination in PAGODA: A Case Study," Electronic Notes in Theoretical Computer Science, 2007, pp. 97-112, 181 (2007) 97-112, Elsevire, New York City, NY.
Office Action received for U.S. Appl. No. 14/583,237, dated Sep. 30, 2016, 28 pagees.
Office Action received for U.S. Appl. No. 14/583,237, dated Nov. 30, 2017, 29 pages.
International Search Report and Written Opinion for International Application No. PCT/US2015/000402, dated Apr. 25, 2016, 15 pages.
Notice of Allowance received for U.S. Appl. No. 14/581,885, dated Jul. 10, 2017, 6 pages.
Office Action received for U.S. Appl. No. 14/581,885, dated Apr. 27, 2017, 11 pages.
Office Action received for U.S. Appl. No. 14/581,885, dated Oct. 6, 2016, 15 pages.
Notice of Allowance received for U.S. Appl. No. 09/915,082, dated Sep. 15, 2006, 3 pages.
Office Action received for U.S. Appl. No. 09/915,082, dated Apr. 10, 2006, 6 pages.
Office Action received for U.S. Appl. No. 09/915,082, dated Nov. 10, 2005, 6 pages.
Office Action received for U.S. Appl. No. 09/915,082, dated Jul. 7, 2005, 6 pages.
Office Action received for U.S. Appl. No. 09/915,082, dated Mar. 7, 2005, 7 pages.
Communication received for European Patent Application No. 15873996.1 dated Aug. 30, 2017, 2 pages.
Communication received for Chinese Patent Application No. 201580063584.X, dated Jun. 15, 2017, 2 pages including 1 page of English translation.
International Preliminary Report on Patentability received for International Application No. PCT/US2015/062278, dated Jul. 6, 2017, 10 pages.
International Search Report and Written Opinion received for PCT Patent Application No. PCT/US2016/064761, dated Mar. 24, 2016, 10 pages.
"Thread Pools," 2005, 3 pages, Sun Java System application Server Platform Edition 8.1, Sun Microsystems Inc.
Craeynest, et al., "Fairness-Aware Scheduling on Single-ISA Hetrogeneous Multi-Cores," 2013, 11 pages.
Cai, et al., "Meeting Points: Using Thread Critically to Adapt Multicore Hardware to Parallel Regions," 2008, 10 pages.
Notice of Allowance received for U.S. Appl. No. 14/583,254, dated Jun. 22, 2016, 17 pages.
Office Action received for U.S. Appl. No. 14/583,254, dated Jan. 5, 2016, 14 pages.

(56) References Cited

OTHER PUBLICATIONS

"Nonparametric Statistic," Memidex Dictonary/Thesaurus, Jul. 11, 2016, retrieved from http://www.memidex.com/nonparametric-statistic.

Office Action received for U.S. Appl. No. 14/583,237, dated Mar. 24, 2016, 26 pages.

International Search Report and Written Opinion received for International Application No. PCT/US2015/062278, dated Mar. 2, 2016, 13 pages.

Eastep, Jonathan M., "Smart Data Structures: An Online Machine Learning Approach to Multicore Data Structures," paper, Jun. 2011, 180 pages, Massachusetts Institute of Technology, Cambridge, MA.

Office Action received for U.S. Appl. No. 14/580,150, dated Apr. 8, 2016, 11 pages.

Office Action received for U.S. Appl. No. 14/580,150, dated Sep. 9, 2016, 12 pages.

Office Action received for U.S. Appl. No. 14/580,150, dated Jun. 16, 2017, 13 pages.

Office Action received for U.S. Appl. No. 14/580,150, dated Nov. 27, 2017, 16 pages.

Japanese Office Action received for patent application No. 2017-531539, dated Sep. 10, 2019, 14 pages. (English Translation Provided).

First Office Action from Chinese Patent Application No. 201580063584.X, dated Apr. 15, 2020, 10 pages, including reporting letter in English.

\* cited by examiner

HOLISTIC GLOBAL PERFORMANCE AND POWER MANAGEMENT

RELATED APPLICATIONS

This application is a continuation and claims priority under 35 U.S.C. § 120 of pending U.S. patent application Ser. No. 14/580,150, filed Dec. 22, 2014, entitled HOLISTIC GLOBAL PERFORMANCE AND POWER MANAGEMENT. The entire disclosure(s) of these documents are incorporated by reference herein for all purposes.

FIELD

The present disclosure generally relates to the field of electronics. More particularly, some embodiments generally relates to power management for servers and other computing devices.

BACKGROUND

High Performance Computing (HPC) systems may include a large number of nodes connected by a fabric for distributed computing. Moreover, an application is divided into tasks that run concurrently across the nodes in the HPC system. These tasks are broken down into sequential milestones, and tasks are expected to reach each of these milestones at the same time.

Unfortunately, if any node completes the work toward the next milestone more slowly than the other nodes, the progress of the entire application halts until the slowest task completes its work. When this happens, the application loses potential performance and power is wasted in the nodes that must wait.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
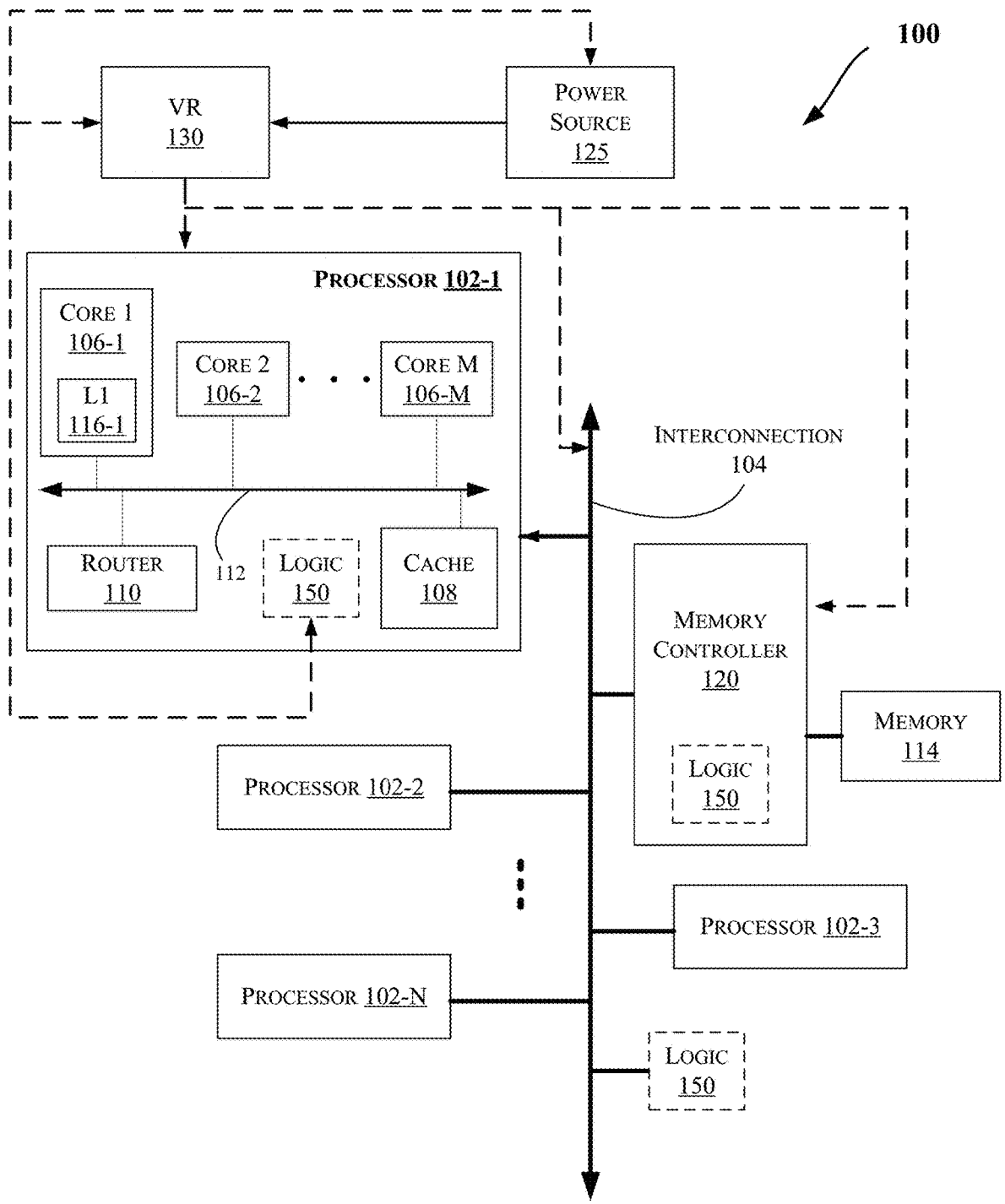
FIGS. 1 and 4-6 illustrate block diagrams of various computing systems, according to some embodiments.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As mentioned above, High Performance Computing (HPC) systems may include a large number of nodes coupled by a high speed network fabric for distributed computing. As discussed herein, a "node" generally refers to a compute element (that may include one or more processors such as general-purpose processors or graphics processors discussed herein), a connection to the network fabric, a log in component, a service component, and possibly memory, IO (Input/Output) device(s), or other components. Generally, an application (also referred to as a "job" herein) is divided into tasks that run concurrently across many (e.g., tens of thousands) of the nodes in the HPC system. There may be one or multiple tasks mapped to each node, and a single task may run across one or multiple cores. The tasks may consist of the same program operating on different data of the same problem set. Tasks may be broken down into sequential milestones, and all tasks are expected to complete the computation between milestones in the same amount of time, leading to a so-called bulk-synchronous style of computation. At milestones, the tasks may synchronize through an operation such as a global barrier.

Unfortunately, if any core or node completes the work between synchronizations more slowly than the others (for any one of numerous reasons), the progress of the entire application halts until the slowest task completes the work. When this happens, the application loses potential performance and power is wasted in the cores or nodes that must wait. This problem has a number of names including load imbalance, application or Operating System jitter, and performance variation. Load imbalance can have a number of causes ranging from static factors such as manufacturing variability leading to a distribution in performance of hardware components to dynamic factors such as page faults occurring at different times on different cores, Operating System interference affecting some cores but not others, recoverable hardware errors temporarily crippling one core or node but not others, or uneven distribution of work among tasks within the application.

Load imbalance is becoming a serious source of performance loss and wasted power as HPC systems continue to increase in scale and complexity. Manufacturing variability is especially problematic. Recent processors cannot run floating-point intensive workloads at the maximum core frequencies without exceeding thermal design and power limits. Moreover, two processors of identical model and stepping require different power to achieve the same core frequencies. The industry expects the variation in processor performance to exceed 20% at a given power budget.

To this end, some embodiments provide holistic global performance and power management. More specifically, a new performance and power management framework is described for coordinating software and hardware policy across (e.g., all) nodes in a job, while managing the job to configurable objective functions (e.g. maximum performance within a job power cap, maximum efficiency within a job power cap, etc.). One use of the framework is to solve the load balancing problem described above.

Additionally, some embodiments provide a Holistic Global Performance and Power Management (HGPPM) framework that coordinates performance and power management decisions across (e.g., all) nodes in a job, while managing the job to a job power cap or other configurable objective functions such as maximum performance, maximum efficiency (e.g., minimum energy-delay product), maximum performance while managing to a job power cap, maximum efficiency while managing to a job power cap, etc. HGPPM techniques are, at least in part, based on a hierarchical feedback-guided control system implemented with a scalable, fast Hierarchical Partially Observable Markov Decision Process (H-POMDP) Reinforcement Learning (RL) method. Such embodiments can mitigate application load imbalance by steering power between hierarchical system domains, and introducing the key capability to coordinate other broader optimizations across software and hardware abstraction boundaries. For example, in some embodiments, HGPPM may attain higher performance or efficiency by simultaneously coordinating and optimizing the choice of power allocation among hierarchical systems domains to achieve load balance and the choice of application algorithm from a repertoire to find the highest performing option for the given system architecture, problem size, or power allocation.

Moreover, the techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, etc.), including those discussed with reference to FIGS. 1-6. More particularly, FIG. 1 illustrates a block diagram of a computing system 100, according to an embodiment. FIG. 1 is a schematic representation and not meant to reflect physical organization. The system 100 includes one or more processors 102-1 through 102-N (generally referred to herein as "processors 102" or "processor 102"). The processors 102 may communicate via an interconnection (or fabric) 104. There is also a possibility that one or more processors can share a connection to the interconnect or fabric. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. This may also be implemented with multiple integrated circuits in the same package. Moreover, the chip may include one or more shared and/or private caches (such as cache 108), buses or interconnections (such as a bus or interconnection 112), logic 150, memory controllers such as those discussed with reference to FIGS. 4-6 (including NVM (Non-Volatile Memory), for example, flash memory, an SSD (Solid State Drive), etc.), or other components. In other embodiments, components of FIG. 1 may be arranged in different ways, e.g., the VR, memory controller, and main memory may be inside the processor while the router may be outside of the processor.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1. In some embodiments, when there are a multitude of routers, some could be inside the processor and some could be outside.

The cache 108 may store data (e.g., including instructions) that are utilized by one or more components of the processor 102-1, such as the cores 106. For example, the cache 108 may locally cache data stored in (volatile and/or non-volatile) memory 114 (also referred to herein interchangeably as "main memory") for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC) (such as L1 and/or L2 caches). Also, each of the cores 106 may include a level 1 (L1) cache (116-1) (generally referred to herein as "L1 cache 116"). Various components of the processor 102-1 may communicate with the cache 108 directly, through a bus or fabric (e.g., the bus 112), and/or a memory controller or hub.

The system 100 may also include a (e.g., platform) power source 125 (e.g., a Direct Current (DC) power source or an Alternating Current (AC) power source) to provide power to one or more components of the system 100. The power source 125 could include a PV (Photo Voltaic) panel, wind generator, thermal generator water/hydro turbine, etc. In some embodiments, the power source 125 may include one or more battery packs (e.g., charged by one or more of a PV panel, wind generator, thermal generator water/hydro turbine, plug-in power supply (for example, coupled to an AC power grid), etc.) and/or plug-in power supplies.

The power source 125 may be coupled to components of system 100 through a Voltage Regulator (VR) 130. Moreover, even though FIG. 1 illustrates one power source 125 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores, and/or other component(s) of the system 100). Additionally, while FIG. 1 illustrates the power source 125 and the voltage regulator 130 as separate components, the power source 125 and the voltage regulator 130 may be incorporated into other components of system 100. For example, all or portions of the VR 130 may be incorporated into the power source 125, an SOC (such as those discussed with reference to FIG. 6), and/or processor 102.

As shown in FIG. 1, memory 114 may be coupled to other components of system 100 through memory controller 120. System 100 also includes logic 150 to facilitate and/or perform one or more operations with reference to the HGPPM techniques/embodiments as discussed herein. For example, logic 150 may perform operation(s) corresponding to performance and/or power management of one or more compute nodes and/or components of system 100 (including for example, processor 102, memory controller 120, memory 114 (also referred to herein sometimes as "external memory"), caches 116 or 108, and/or interconnection or fabric(s) 104 and/or 112, etc.). Moreover, even though logic 150 is shown in several optional locations in system 100, the logic 150 may be located elsewhere in system 100.

Moreover, an embodiment provides a scalable dynamic technique for coordinating performance and power management policy across (e.g., all) the nodes in a job and across software and hardware abstraction layers, all while managing the job to configurable objective functions. Objective functions may include but are not limited to: maximizing performance while meeting a power cap, minimizing performance differences between computational elements (nodes or cores) while meeting a power cap (to mitigate load imbalance), maximizing efficiency, etc. Such techniques are collectively referred to herein as Holistic Global Performance and Power Management (HGPPM), which is at least partially based on a hierarchical machine learning algorithm in one embodiment.

Prior HPC power managers have a number of limitations. First, they exacerbate performance differences between nodes by applying uniform power caps to each node, leading to unequal frequency on each node and loss of application performance. The industry generally expects performance of nodes to vary by more than 20% at a given power cap, so it is critical to mitigate not exacerbate these performance differences. Second, prior power managers lack the capability to coordinate software and hardware policy. Unfortunately, software and hardware policy have historically been tuned via independent control systems. This leads to interference between control systems which degrades results. It is critical to bring tuning of software and hardware policy under a unified control system. Third, prior HPC power managers have lacked scalability. They employ centralized designs which cannot scale to coordinate policy across many (e.g., tens of thousands of) nodes in future systems. A radically different design is needed. Finally, prior HPC systems have lacked flexibility. To meet the extreme performance and efficiency challenges of Exascale systems, novel policy knobs need to be designed and more opportunities need to be exploited to optimize the system, but current solutions lack power manager frameworks capable of comprehending and controlling any new policies. Also, flexibility is needed in programming the tradeoffs between performance and power that a power manager will make (in some cases efficiency will be preferred over performance, for example), but prior power managers only tend to support performance-biased objective functions. Current management techniques are far too brittle.

HGPPM embodiments are a breakthrough that simultaneously solves the load imbalance problem, scalability problem, and flexibility problem while introducing the key capability of coordinating software and hardware policy. These can be considered as key requirements for increasing performance and efficiency in Exascale systems. More particularly, HGPPM improves upon prior art in a number of important ways. HGPPM introduces the capability to detect and mitigate load imbalance in a job by balancing the power allocated to computational elements to equalize their loads. HGPPM is the first technique that can mitigate a variety of sources of load imbalance ranging from manufacturing variability to application or Operating System jitter to recoverable hardware errors to intrinsic sources of imbalance such as the application or Operating System not dividing work evenly among computational elements (which are also referred to herein as "nodes" or "cores" interchangeably). Furthermore, at least an embodiment provides a load balancing technique that is synergistic with simultaneously managing a job to a power cap.

HGPPM embodiments also introduce key new capabilities: (a) coordination of policy optimizations across software and hardware abstraction boundaries; (b) extensibility to new types of policy via robust techniques for policy optimization; and/or (c) flexibility via support for management to configurable objective functions. There are no other performance or power manager methods that support these capabilities while simultaneously scaling to coordinate policy across all computational elements in a job. The scalability, robustness, and flexibility of such embodiments are a breakthrough.

Examples of new policy and optimizations enabled by HGPPM embodiments include but are not limited to: (a) tuning applications for maximum performance or efficiency through a new policy knob controlling the number of cores that each application task may utilize; (b) tuning the processor for better performance or efficiency through a new policy knob controlling how aggressively the processor speculatively executes arithmetic operations or memory prefetch operations, etc. The design of new policies and optimizations is considered to be critical for meeting performance and efficiency challenges of Exascale systems, and HGPPM embodiments are the first performance and power management framework capable of orchestrating such optimizations. Moreover, HGPPM's hierarchical learning framework further improves scalability and increases responsiveness of load balancing for better application performance or efficiency.

In an embodiment, HGPPM is used to globally coordinate performance and power policy across (e.g., all) nodes in a job while managing the job to configurable objective functions. There is an HGPPM instance bound to each job. The HGPPM approach solves the scalability challenge of deciding policy for many nodes (e.g., tens of thousands of nodes) in a job by adopting a hierarchical design based on Hierarchical Partially Observable Markov Decision Process (H-POMDP) machine learning. In particular, one embodiment employs a hierarchy of identical Reinforcement Learning agents. As discussed herein, the use of "node," "core," "computational element," etc. may be interchangeable, e.g., where each of such units refers to a computing component capable of performing one or more operations discussed herein with reference to that unit.

Reinforcement Learning agents optimize policy not through models but by interaction and empirical experimentation with the environment; they continually assess the consequences of actions to adapt their behavior for best results, where the quality of results is defined by an objective function. Experiments are selected in a systematic way to navigate the space of all possible policy options in an efficient manner. According to an embodiment, the Reinforcement Learning algorithm employs a technique called Stochastic Policy Gradients to navigate efficiently while still achieving good or acceptable results.

In an H-POMDP, each agent is identical and works independently on a sub-problem of the total problem, but all agents use the same objective function and sub-problems are defined hierarchically such that the decisions of one agent constrain the space of options that its children can consider. As such, the parent guides the behavior of its children to help the children identify the best policy faster or exclude the children from choosing certain policy options. In this hierarchical manner, performance and power policy decisions are coordinated from the root of the Reinforcement Learning agent tree hierarchy to the leaves.

Figure 2:
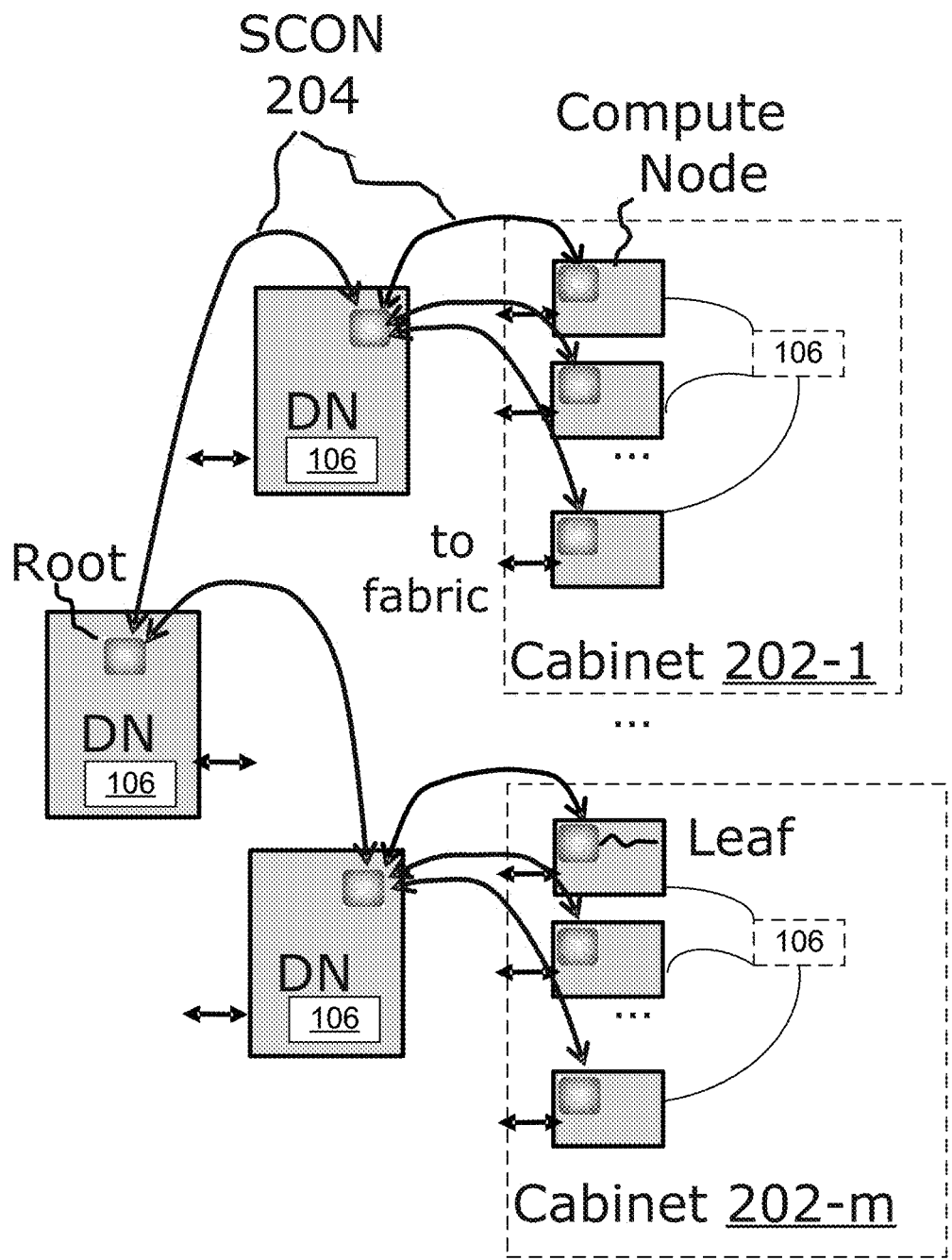
FIG. 2 illustrates a block diagram of a Holistic Global Performance and Power Management (HGPPM) system, according to an embodiment.

FIG. 2 illustrates a block diagram of an HGPPM system, according to an embodiment. FIG. 2 illustrates a tree depth of three but this is only for exemplary purposes and a deeper or shallower tree depth may be used in various embodiments. In an embodiment, each compute node of the system shown in FIG. 2 may include one or more components discussed with the computing systems of FIGS. 1, 4, 5, and/or 6. More specifically, global coordination is enabled by a scalable, hierarchical k-ary tree design. System policy is decomposed hierarchically (e.g., allocating power among cabinets 202-0 through 202-$m$ (where a "cabinet" generally refers to a plurality of nodes), then among nodes). Good global power allocation decision is then obtained via policy gradients algorithm may be implemented using the Natural Actor-Critic framework, where a are actions (a.k.a. knob settings), r is the reward, α is the step size:

```
1:  Input: Parameterized policy π(a_t|θ) with initial parameters θ = θ_0 and its deriva-
    tive ∇_θ log π(a_t|θ).
2:  Set parameters A_{t+1} = 0, b_{t+1} = 0, z_{t+1} = 0.
3:  For t = 0, 1, 2, . . . do
4:      Sample a_t ~ π(a_t| θ_t) and set knobs to a_t
5:      Observe r_t
6:      Update basis functions:
            φ̃_t = [1, 0]^T, φ̂_t = [1, ∇_θ log π(a_t|θ)^T]^T
7:      Update statistics: z_{t+1} = λz_t + φ̂_t,
            A_{t+1} = A_t + z_{t+1}(φ̂_t − γφ̃_t)^T, b_{t+1} = b_t + z_{t+1}r_t.
8:      When desired, compute natural gradient:
            [υ w^T]^T = A_{t+1}^{−1} b_{t+1}
9:      Update policy parameters: θ_{t+1} = θ_t + αw if gradient has converged
10: end.
```

H-POMDP Reinforcement Learning agents running in each node of the tree, as further discussed herein. Aggregation of power and/or performance telemetry (flowing up the tree from leaf to root) and dissemination of control (from parent to children) is provided by a Scalable Overlay Network (SCON) 204. The SCON is a logical network implemented on top of one of the physical networks in the HPC system. The physical network may be an in-band network used by the application (e.g. network fabric) or out-of-band network such as Ethernet (e.g., in accordance with IEEE (Institute of Electrical and Electronics Engineers) 802.3 standard). In one embodiment, the physical network may be the same as or similar to the network 403 discussed with reference to FIGS. 4 and 5. In FIG. 2, "DN" refers to a Dedicated Node (e.g., a node that is reserved and not used by the application) and the small boxes in each DN and Compute Node refer to an H-POMDP agent. As discussed herein, H-POMDP agent may be Reinforcement Learning agent in an embodiment. As discussed herein, a per-core (or per a portion of a core) policy (such as the allocation of power to each core or core portion) may be provided. As shown in FIG. 2, each compute node may include one or more cores. Also, in an embodiment, the Leaf H-POMDP agent is responsible for tuning any policy inside the compute node (which may include tuning per-core policies).

In an embodiment, a stochastic policy gradients technique is used. Each node in the HGPPM tree implements a Reinforcement Learning POMDP algorithm, applying the Policy Gradients method to search for best policy. For example, the policy may be considered as a probability distribution over a set of discrete knob settings. For example, the knob includes a set of choices for how the parent agent could allocate power among its children. The policy is evaluated by sampling a setting for the knob from the distribution, testing it out some number of times, and measuring the resulting reward. The policy is improved through a method analogous to gradient ascent in an embodiment. To use a gradient-based method, the policy is made differentiable and may be made differentiable by adopting stochastic soft-max policy. Then, gradient of the reward may be estimated with respect to policy and step the policy in the gradient direction, to move it toward the policy that maximizes reward. The stochastic policy may be adopted to avoid "local maxima" pitfalls of simpler gradient methods and to balance tradeoffs of exploration vs. exploitation, as further discussed below.

In one embodiment the following operations may be used to implement the stochastic policy gradients. The stochastic As mentioned before, to make the policy differentiable and suitable for gradient-based learning, a stochastic soft-max policy may be used. In particular, the exponential family parameterization of the multinomial distribution is used giving each knob i a set of real-valued weights $\theta^i$. The probability of getting knob setting j out of the n possibilities when sampling from the probability distribution for knob i is given by:

$$p(a_t^i = j | \theta^i) = \exp\{\theta_j^i\} / \sum_{k=1}^{n} \exp\{\theta_k^i\}$$

The gradient needed in the Natural Actor Critic algorithm can be computed (efficiently) by:

$$\nabla_\theta \log \pi(a_t^i|\theta^i) = \delta(a_t^i) - \pi(a_t^i|\theta^i)$$

where $\pi(a_t^i|\theta^i)$ is the current probability distribution over the settings that knob i can take on; t is the time step of the algorithm. ∇ is the gradient operator, so $\nabla_\theta$ is the gradient with respect to theta. $\delta(a_t^i)$ is a vector of zeroes with a 1 in the index given by $a_t^i$.

As described herein, HGPPM can be applied to correcting application load imbalance by balancing power among the nodes in a job. In one example of how the load balancing problem can be decomposed hierarchically, the problem of load balancing for the whole job is divided into load balancing among the cabinets used by the job, then load balancing among the nodes in each cabinet, then load balancing among the tasks mapped to each node, then load balancing among the cores running each task. At each granularity, performance is compared dynamically, and power is steered from the computational elements that are ahead to the elements that are behind (with reference to reaching the next milestone in the sequence and reaching the barrier) to maximize or improve application performance.

An embodiment maps the process of job load balancing to the abstractions of Reinforcement Learning by tasking each agent with learning the best division of its input power budget among its children and defining the objective function such that a) discrepancies in performance of the child agents are penalized and b) aggregate performance is rewarded, where aggregate performance is taken to be the minimum performance obtained by the child agents. Each child agent's performance may be an average or median (or other functions) of some number of samples. Each agent learns how to divide its input budget (from its parent) among its children to obtain the best performance from the children. The children, in turn, take their budget and divide it among their children, and so on. The decisions at the lowest levels of the tree may specify how the hardware should divide power among different types of processor and external memory resources. Performance can be defined according to many metrics. For example, at the lowest level of the H-POMDP tree, the metric could be core frequency, a measure of each core's progress toward the next application milestone (provided to HGPPM via annotations made by the programmer or inferred automatically by analysis of performance counters or other means), the runtime of the application phases completed so far between milestones, the rate of instructions retired, the rate of main memory accesses, etc.

In general, the objective function evaluated by each Reinforcement Learning agent in the H-POMDP will be an aggregation of each child's objective function value. Many aggregations are possible including the minimum of the child objective function values, the average, the variance, etc. In one embodiment, if the objective function is to maximize performance, then performance of the node may be defined as the minimum performance of any active cores in processors in the node, performance of the cabinet may be defined as the minimum performance of any active node in the cabinet, and performance of the job may be defined as the minimum performance of any active cabinet in the job. The aggregation computation can be performed by HGPPM techniques and/or through the assistance of a SCON in the HPC system.

As described herein, HGPPM embodiments can tune different kinds of policies (beyond power budgets) and tune more than one type at once. In this mode, HGPPM techniques compose the policies into a joint policy; the Reinforcement Learning agents experiment with the joint policy options and optimize the joint policy according to the objective function. In one example, consider a hierarchy terminating with one Reinforcement Learning agent for each node. Suppose the agent is tasked with jointly learning two policies: how to divide the node power budget among different types of hardware resources in the node and how many threads/cores each software process on the node should utilize. The agent creates a joint policy having one option for each combination of power budget division choices and parallelism choices. The learning agent tests new power budget choices and new parallelism choices together, measures the combined effect on the objective function, then navigates toward the best joint policy over time.

Figure 3:
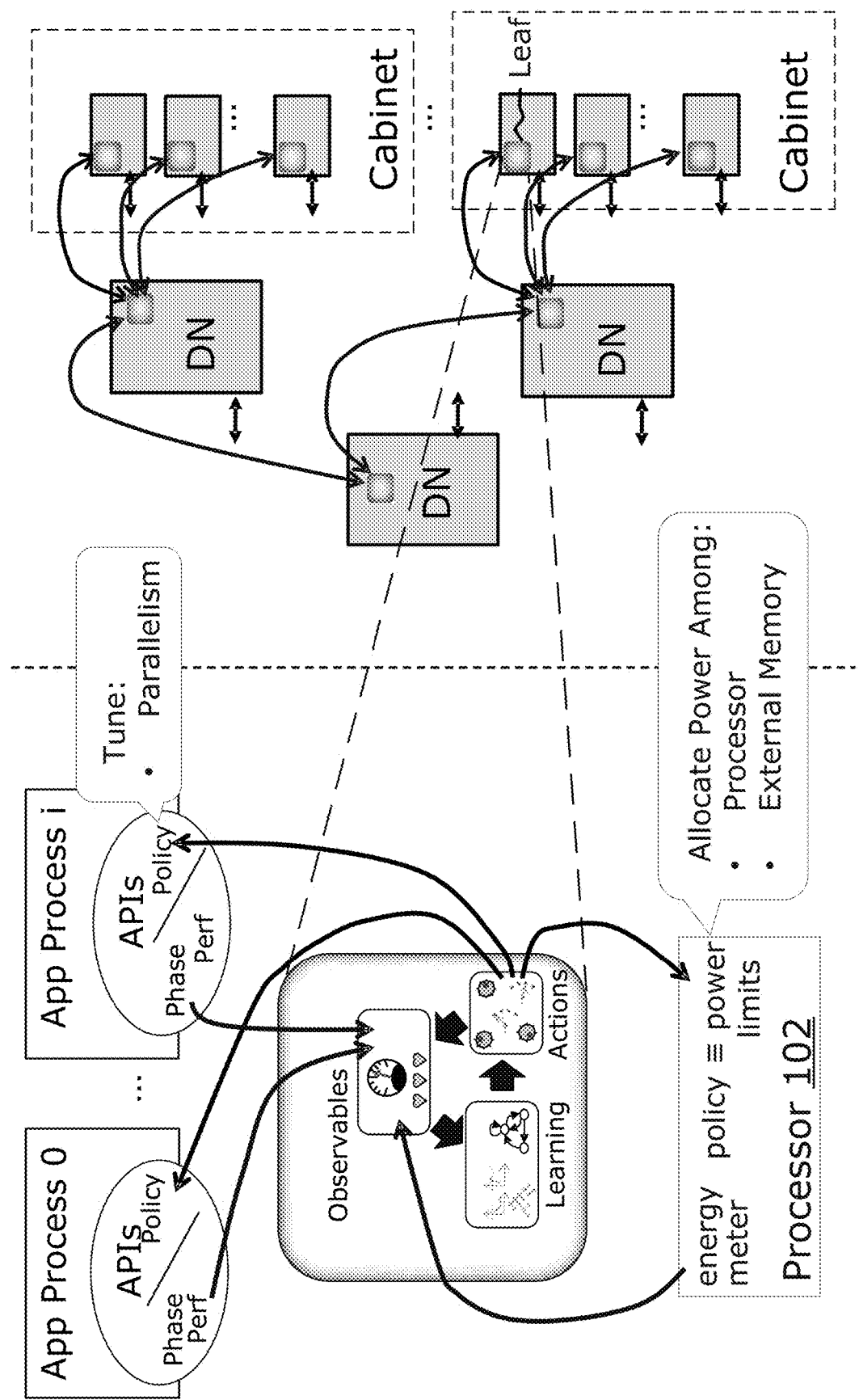
FIG. 3 illustrates a block diagram of interaction details for a Hierarchical Partially Observable Markov Decision Process (H-POMDP) agent, according to an embodiment.

FIG. 3 zooms in on the Leaf H-POMDP RL agent in one of the Compute Nodes from FIG. 2. It shows the interaction between the RL agent, the application, and the processor in the node, including the inputs to the RL agent (labeled as Observables in FIG. 3) as well as the new policy settings that are output by the RL agent. The Figure illustrates management of the example policies discussed above: the number of threads per application process and the division of node power budget among hardware resources. In one embodiment, the H-POMDP RL agent takes in a performance and phase signal from the application. In other embodiments, the performance and phase signals may be automatically inferred by HGPPM without programmer annotation of the application (as described previously). From the processor, the H-POMDP RL agent takes in an energy signal. The outputs of the RL agent are new policy settings (e.g. a new setting for the number of threads per application process or a new subdivision of the node power budget among hardware components of the node).

The observables may be composited in various ways to define the desired objective function. The objective function is evaluated and supplied to the learning algorithm as the reward (as previously described). The RL agent uses this reward signal to measure the impact of different policy settings. Over time, the RL agent searches the policy space, experimenting with policy settings by enacting them (output policy settings are labeled as Actions in FIG. 3) and measuring the effect on the observables and reward signal. As described previously, the RL agent navigates the policy space over time, searching in an efficient way, until it identifies the best policy setting.

The illustration in FIG. 3 is an example of an HGPPM embodiment where multiple policies have been composited. As more policies are composited, the size of the search space may grow exponentially. There can also be inter-dependencies between the policies which make the search space complex. The joint policy described above (division of node power budget among node hardware resources and number of threads/cores per software process) is an example of a joint policy having complex inter-dependencies: the best division of power among resources depends on the balance of communication, memory, and computation in the application processes, but that balance is dependent on the number of threads/cores employed by the application processes; the best number of threads/cores for the application processes to use depends on the available communication, memory, and computational bandwidth (but the amount of bandwidth can depend on how much power each resource has been allocated).

One embodiment of HGPPM scales to handle large search spaces with complex tradeoffs by employing a Stochastic Policy Gradients Reinforcement Learning technique. The Stochastic Policy Gradients technique estimates the gradient of the objective function metric with respect to the policy, then steps in the gradient direction; next time, the joint policy option that will be tried is the one that is a step away from the previous one (in the gradient direction). The Stochastic Policy Gradients method takes steps in the gradient direction to navigate through the exponential search space, trying only those directions that are expected to improve results, rather than exhaustively searching the whole space.

One drawback of gradient-based search techniques is that they tend to make the assumption that the search space has a convex shape; if not, the method is not guaranteed to land on the globally optimal decisions. For this reason, a Stochastic Policy Gradients algorithm may be adopted rather than a regular Policy Gradients Algorithm. Instead of selecting the next policy option based on the gradient direction, a probability is assigned to all options and sample from the distribution. With non-zero probability, the step is taken in a direction not indicated by the gradient to be optimal. In doing so, this embodiment can escape local maxima. In a Stochastic Policy Gradients algorithm, instead of learning the policy option that maximizes the objective function, a policy distribution is learned that maximizes it. Steps in the gradient direction update the probability distribution and tend to assign more probability to the directions consistent with the gradient, but there is still some probability of selecting other options.

The approach adopted in an embodiment also addresses three classical challenges with Reinforcement Learning techniques and H-POMDPs. The first challenge is a Reinforcement Learning challenge having to do with balancing exploration of new regions of the policy space with exploitation of the best-known optimal policies. A method that emphasizes exploration too much uses sub-optimal policies for the majority of the time. A method that emphasizes exploitation too much may settle for a sub-optimal policy and leave potential benefit on the table. The Stochastic Policy Gradients techniques used in some embodiments guarantees that new regions of the search space will be tried because all policy options have non-zero probability in the policy distribution.

Moreover, while there would seem to be a risk that taking gradient steps and updating the distribution to add weight in the promising directions may gradually create a strong bias for the "best known" option and decimate exploration, one embodiment incorporates a regularizer component which counter-balances undue bias by slowly driving the distribution to a uniform distribution. The strengths of these opposing forces are systematically tuned at runtime. One embodiment measures how stable and predictable the relationship between the objective function metric and the policy is. The more stable and predictable the relationship, the stronger the force of gradient steps (note: the amount of bias added with each step may be constant, but gradient steps may be taken more frequently, making the force effectively stronger). When the relationship is unstable or unpredictable, regularization wins.

The second challenge is one that affects all control systems, not just Reinforcement Learning control systems. It is the challenge of noise. An embodiment solves noise challenges partly through the opposing forces mechanism above and partly through digital signal processing techniques. In particular, noise will cause the relationship between the objective function metric and the policy to be poorly predicted. An embodiment only takes gradient steps when noise has recently been low and the relationship is predictable (in other words when the gradient result can be relied upon to steer toward better policy). In periods of high noise, the regularizer will win. One embodiment has free parameters configuring the bias strength of each gradient step and each regularization step. These parameters are configured to ensure that as long as the application experiences some periods with a stable, predictable relationship between the objective function metric and the policy, the bias of gradient steps will win overall and the policy distribution will approach optimal over time. Many methods can be used to configure the bias and regularizer step sizes; some are manual but can follow canonical techniques while some are automatic online methods.

The other mechanism that some embodiments use to solve noise challenges is digital signal processing. Many signal processing methods can be used. In one example, a moving average or median filter is applied to the objective function signal. Filters of this kind tend to smooth the signal using a short history of previous values. It is also possible to apply filters to the inputs of the objective function. This can have advantages if the objective function divides by any signals with comparatively small magnitude, where noise in the denominator would be amplified by the division operation.

The third challenge is ensuring control stability in spite of distributed tuning throughout the H-POMDP Reinforcement Learning hierarchy. Consider the following example. Suppose the parent changes to a new power budget before the children have had a chance to search for the optimal division of that budget among their children. If that happens, the parent may base its estimate of how well the power budget works on incomplete data from the children. In practice, parents may never obtain complete data from their children, and the data will be stochastic. Nevertheless, the H-POMDP may never converge or may take too long to converge on a good global policy unless the children are given time to find good divisions of the budget.

There are many solutions to this problem in accordance with some embodiments. One example includes arranging for the Reinforcement Learning agents to operate at pre-defined time intervals with the interval duration coarsening as a move is made up the hierarchy (from leaf to root). Another approach is to let the tuning timescales be self-configuring throughout the hierarchy of agents. The levels of the hierarchy operate as fast as possible, but their speed is rate-limited to ensure correctness: the parent blocks waiting for input from the child; the child only sends performance or other information required to evaluate the object function up to the parent when the child has achieved a good policy (e.g. a good allocation of power). As a result, the parent cannot set a new policy (e.g., a new power budget for the child) before the child is ready. This self-configuration strategy has the advantage of maximizing responsiveness of global policy optimization. There are many ways to determine when a good policy is reached in accordance with some embodiments. One canonical way is convergence testing: a good policy has been reached if the change in policy over the last k iterations has been less than epsilon. k and epsilon are free parameters that may be tuned according to offline manual procedures.

At the last level of the H-POMDP hierarchy, the Reinforcement Learning agent will not have children. At this level of the hierarchy, the agents can choose when to sample the objective function metric and try a new policy option. The objective function may be sampled upon phase change events, e.g., sampled at fixed time intervals coarser than phase durations, or sampled at fixed time intervals finer than phase durations. New policies can be tested after one or more samples are collected, but the number of samples to obtain for each test can be variable or fixed.

Additionally, some embodiments may be synergistic with phase-based optimization. For phase based optimization, one copy of the state is instantiated for the Reinforcement Learning agent for each application phase. A similar or the same H-POMDP hierarchy of Reinforcement Learning agents may be used, but they will operate on different state depending on what phase the application is in. At any given time, an embodiment determines the current application phase and loads the correct state. The Reinforcement Learning agents are tasked with optimizing against the same objective function in all phases, but different phases may have unique policy. Furthermore, the current phase and the definition of policy for each phase can be determined in many ways as previously described. Some examples include obtaining the information from the programmer through mark-up in the application (or other software layers). In the case of determining the current phase, it can also be inferred through dynamic analysis of the activity in different computational resources (via the use of event counters in the hardware).

Figure 4:
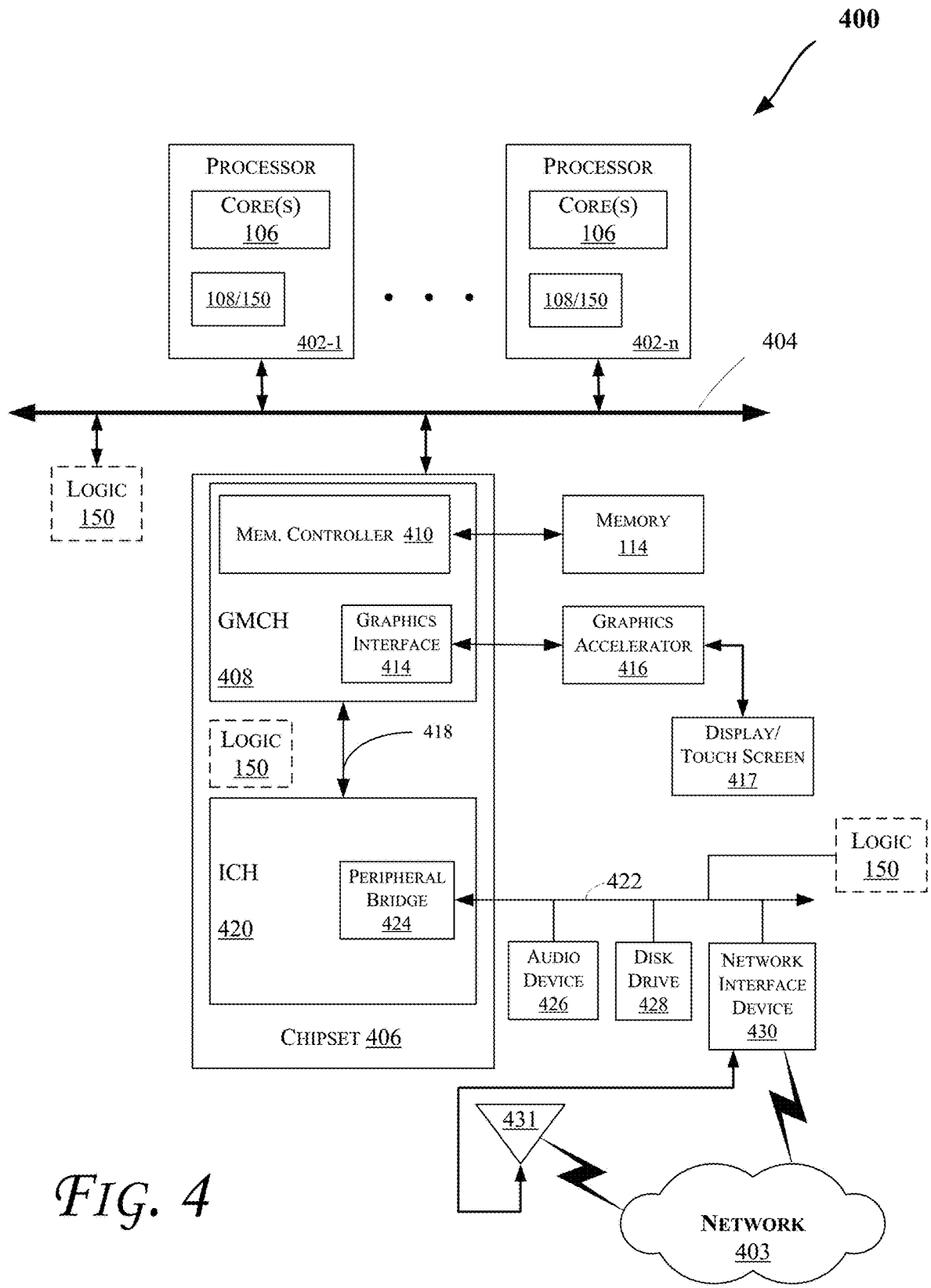

FIG. 4 illustrates a block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), an application processor (such as those used in cell phones, smart phones, etc.), or other types of a processor (including a reduced instruction set computer (RISC) processor or a complex instruction set computer (CISC)).

Various types of computer networks 403 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 4G (4$^{th}$ Generation (wireless/mobile communications)), Low Power Embedded (LPE), etc.). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

In an embodiment, one or more of the processors 402 may be the same or similar to the processors 102 of FIG. 1. For example, one or more of the processors 402 may include one or more of the cores 106 and/or cache 108. Also, the operations discussed with reference to FIGS. 1-3 may be performed by one or more components of the system 400.

A chipset 406 may also communicate with the interconnection network 404. The chipset 406 may include a graphics and memory control hub (GMCH) 408. The GMCH may include a memory controller 410 (which may be the same or similar to the memory controller 120 of FIG. 1) that communicates with the memory 114. System 400 may also include logic 150 in various locations (such as those shown in FIG. 4 but can be in other locations within system 400 (not shown)). The memory 114 may store data, including sequences of instructions that are executed by the CPU 402, or any other device included in the computing system 400. In one embodiment, the memory 114 may include one or more volatile/non-volatile storage (or memory) devices such as random access memory (RAM), dynamic RAM (DRAM), synchronous DRAM (SDRAM), static RAM (SRAM), or other types of storage devices such as a hard disk, nanowire memory, Ferro-electric transistor random access memory (FeTRAM), magnetoresistive random access memory (MRAM), flash memory, Spin Torque Transfer Random Access Memory (STTRAM), Resistive Random Access Memory, 3D Cross Point Memory such as PCM (Phase Change Memory), a Solid State Drive (SSD) with NAND/NOR memory, etc. Additional devices may communicate via the interconnection network 404, such as multiple CPUs and/or multiple system memories.

The GMCH 408 may also include a graphics interface 414 that communicates with a graphics accelerator 416. In one embodiment, the graphics interface 414 may communicate with the graphics accelerator 416 via an accelerated graphics port (AGP) or Peripheral Component Interconnect (PCI) (or PCI express (PCIe) interface). In an embodiment, a display device 417 (such as a flat panel display, touch screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display device 417.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403, e.g., via a wired or wireless interface). As shown, the network interface device 430 may be coupled to an antenna 431 to wirelessly (e.g., via an Institute of Electrical and Electronics Engineers (IEEE) 802.11 interface (including IEEE 802.11a/b/g/n, etc.), cellular interface, 3G, 4G, LPE, etc.) communicate with the network 403. Other devices may communicate via the bus 422. Also, various components (such as the network interface device 430) may communicate with the GMCH 408 in some embodiments. In addition, the processor 402 and the GMCH 408 may be combined to form a single chip. Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
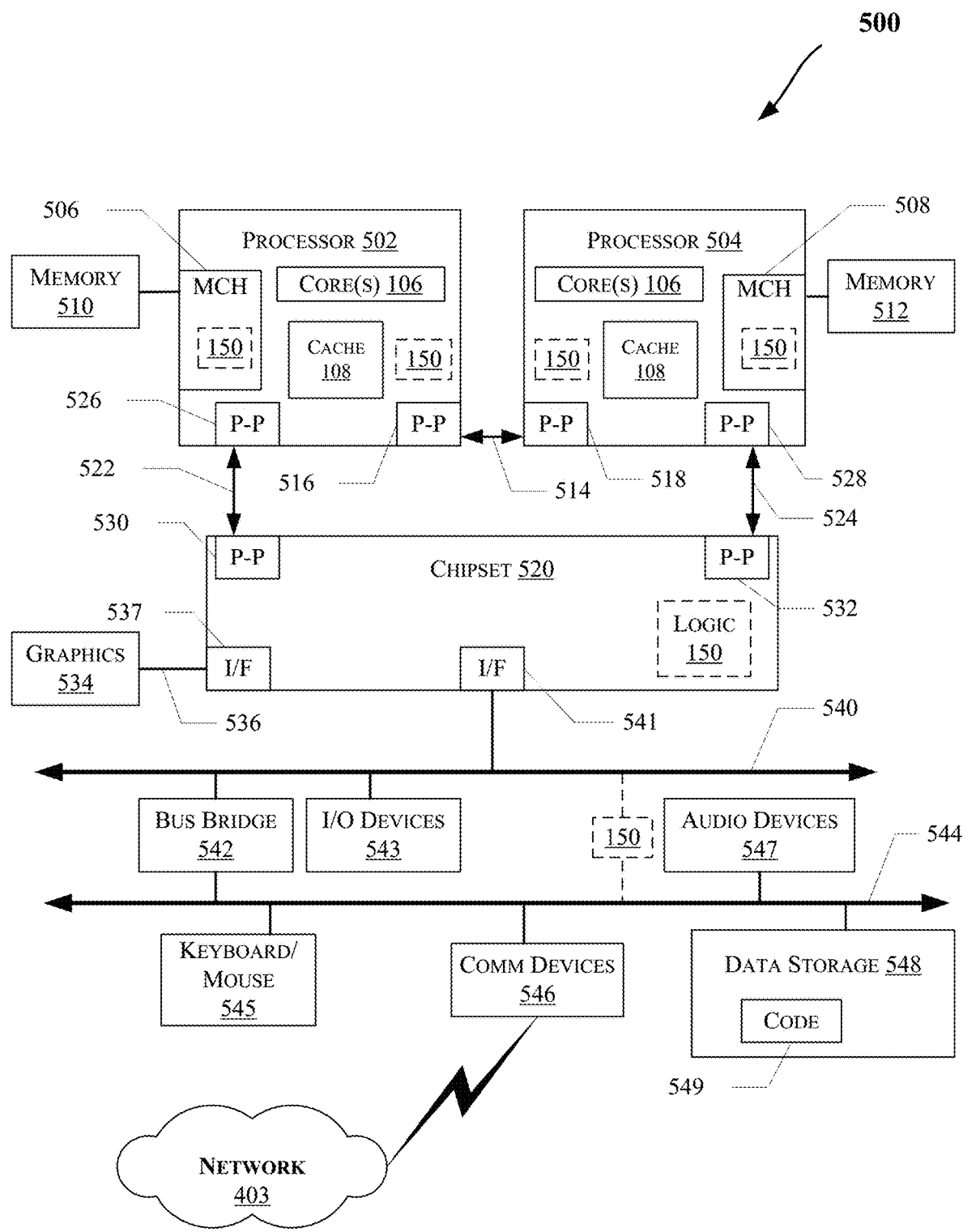

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 114 of FIGS. 1 and/or 4. Also, MCH 506 and 508 may include the memory controller 120 and/or logic 150 of FIGS. 1-4 in some embodiments.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537. As discussed with reference to FIG.

4, the graphics interface 536 may be coupled to a display device (e.g., display 417) in some embodiments.

As shown in FIG. 5, one or more of the cores 106 and/or cache 108 of FIG. 1 may be located within the processors 502 and 504. Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403, as discussed with reference to network interface device 430 for example, including via antenna 431), audio I/O device, and/or a data storage device 548. The data storage device 548 may store code 549 that may be executed by the processors 502 and/or 504.

Figure 6:
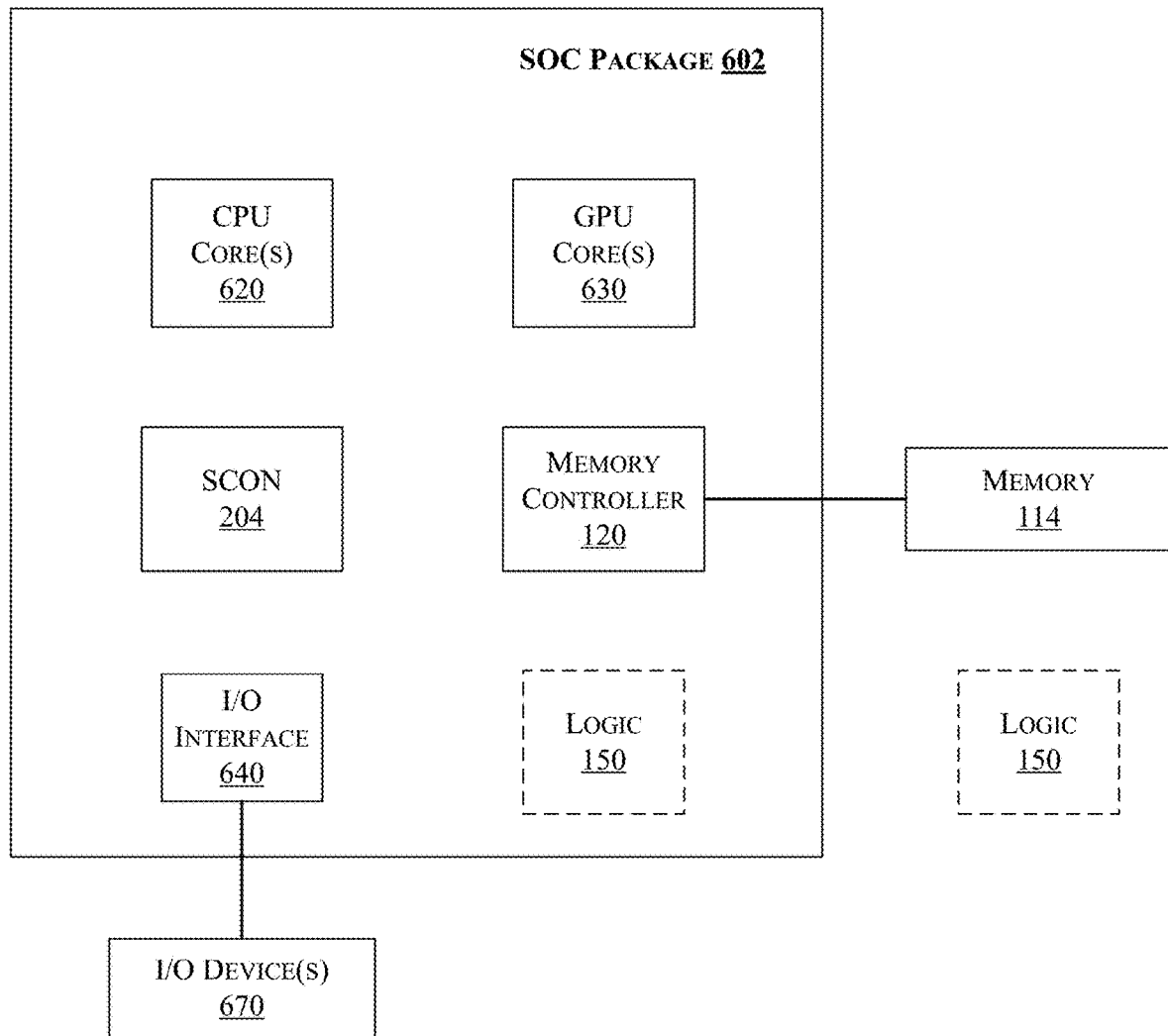

In some embodiments, one or more of the components discussed herein can be embodied on a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and the memory controller 120. Various components of the SOC package 602 may be coupled to an interconnect or bus/network, such as SCON 204 discussed herein with reference to the other figures. Also, the SOC package 602 may include more or less components, such as those discussed herein with reference to the other figures. Further, each component of the SOC package 602 may include one or more other components, e.g., as discussed with reference to the other figures herein. In one embodiment, SOC package 602 (and its components) is provided on one or more Integrated Circuit (IC) die, e.g., which are packaged onto a single semiconductor device.

As illustrated in FIG. 6, SOC package 602 is coupled to the main memory 114 (which is external to the SOC package 602) via an interface such as the memory controller 120. In an embodiment, the memory 114 (or a portion of it) can be integrated on the SOC package 602.

The I/O interface 640 may be coupled to one or more I/O devices 670, e.g., via an interconnect and/or bus such as discussed herein with reference to other figures. I/O device (s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 150 in an embodiment. Alternatively, the logic 150 may be provided outside of the SOC package 602 (i.e., as a discrete logic).

The following examples pertain to further embodiments. Example 1 includes an apparatus comprising: logic, coupled to each node of a plurality of nodes, to cause determination of a policy for power and performance management to transmit to the plurality of nodes, wherein the policy is to cause coordination of power and performance management across the plurality of nodes, wherein the policy is to manage a job to one or more objective functions, wherein the job is to comprise a plurality of tasks that are to run concurrently on the plurality of nodes Example 2 includes the apparatus of example 1, wherein the logic is to determine a separate policy for each of the plurality of nodes Example 3 includes the apparatus of example 1, wherein the logic is to determine a separate policy for at least a portion of each of the plurality of nodes Example 4 includes the apparatus of example 1, wherein the one or more objective functions are to comprise one or more of: maximize performance while meeting a power cap, maximize energy efficiency while meeting a power cap, minimize performance differences between the plurality of nodes while meeting a power cap, maximize performance, or maximize efficiency, or maximize performance and maximize efficiency while meeting a power cap Example 5 includes the apparatus of example 1, wherein the logic is to operate in accordance with hierarchical machine learning operations. Example 6 includes the apparatus of example 1, wherein the logic is to perform one or more operations to solve one or more of: a load imbalance problem, a scalability problem, or a flexibility problem Example 7 includes the apparatus of example 1, wherein the policy is to coordinate power and performance management across all nodes in the job Example 8 includes the apparatus of example 1, wherein the policy is to coordinate power and performance management across all nodes in the job and across software and hardware abstraction layers Example 9 includes the apparatus of example 1, wherein the logic is to determine the policy in accordance with a stochastic policy gradients technique Example 10 includes the apparatus of example 1, wherein the plurality of nodes are to form a cabinet, wherein the policy is decomposed hierarchically among one or more cabinets and then among the plurality of nodes Example 11 includes the apparatus of example 1, further comprising a scalable overlay network to couple the plurality of nodes Example 12 includes the apparatus of example 1, further comprising a scalable overlay network to couple the plurality of nodes, wherein the scalable overlay network is to provide aggregation of power or performance telemetry and dissemination of control Example 13 includes the apparatus of example 1, wherein a System On Chip (SOC) integrated circuit is to comprise the logic and memory Example 14 includes the apparatus of example 1, wherein each node of the plurality of nodes is to comprise one or more of: a processor, having one or more processor cores, a graphics processing unit, having one or more processor cores, a connection to a network fabric, a log in component, a service component, memory, or an input/output device.

Example 15 includes a method comprising: causing determination of a policy for power and performance management for each node of a plurality of nodes; and transmitting the policy to the plurality of nodes, wherein the policy causes coordination of power and performance management across the plurality of nodes, wherein the policy manages a job to one or more objective functions, wherein the job comprises a plurality of tasks that are to run concurrently on the plurality of nodes Example 16 includes the method of example 15, further comprising determining a separate policy for each of the plurality of nodes Example 17 includes the method of example 15, further comprising determining a separate policy for at least a portion of each of the plurality of nodes Example 18 includes the method of example 15, wherein the one or more objective functions comprise one or more of: maximize performance while meeting a power cap, maximize energy efficiency while meeting a power cap, minimize performance differences between the plurality of nodes while meeting a power cap, maximize performance, or maximize efficiency, or maximize performance and maximize efficiency while meeting a power cap Example 19 includes the method of example 15, wherein the determination operates in accordance with hierarchical machine learning operations. Example 20 includes the method of example 15, wherein the determination is performed to solve one or more of: a load imbalance problem, a scalability problem, or a flexibility problem Example 21 includes the method of example 15, further comprising the policy coordinating power and performance management across all nodes in the job Example 22 includes the method of example 15, further comprising the policy coordinating power and performance management across all nodes in the job and across software and hardware abstraction layers Example 23 includes the method of example 15, further comprising determining the policy in accordance with a stochastic policy gradients technique Example 24 includes the method of example 15, wherein the plurality of nodes form a cabinet, wherein the policy is decomposed hierarchically among one or more cabinets and then among the plurality of nodes Example 25 includes the method of example 15, further comprising coupling the plurality of nodes via a scalable overlay network Example 26 includes the method of example 15, further comprising coupling the plurality of nodes via a scalable overlay network, wherein the scalable overlay network provides aggregation of power or performance telemetry and dissemination of control.

Example 27 includes a computer-readable medium comprising one or more instructions that when executed on a processor configure the processor to perform one or more operations to: cause determination of a policy for power and performance management for each node of a plurality of nodes; and transmit the policy to the plurality of nodes, wherein the policy causes coordination of power and performance management across the plurality of nodes, wherein the policy manages a job to one or more objective functions, wherein the job comprises a plurality of tasks that are to run concurrently on the plurality of nodes Example 28 includes the computer-readable medium of example 23, further comprising one or more instructions that when executed on the processor configure the processor to perform one or more operations to cause determination of a separate policy for each of the plurality of nodes Example 29 includes the computer-readable medium of example 23, further comprising one or more instructions that when executed on the processor configure the processor to perform one or more operations to cause determination of a separate policy for at least a portion of each of the plurality of nodes.

Example 30 includes an apparatus comprising means to perform a method as set forth in any preceding example.

Example 31 comprises machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
logic, at least a portion of which is in hardware, wherein the logic is coupled to each node of a plurality of nodes to cause determination of a policy for power and performance management to transmit to the plurality of nodes,
wherein the policy is to cause coordination of power and performance management across the plurality of nodes, wherein the policy is to manage a job to one or more objective functions, wherein the logic is to cause application of non-uniform power caps for each of plurality of nodes, wherein the logic is to operate in accordance with hierarchical machine learning operations, wherein the plurality of nodes is to form a cabinet, wherein the policy is decomposed hierarchically among one or more cabinets and then among the plurality of nodes that are to execute the job.

2. The apparatus of claim 1, wherein the logic is to determine a separate policy for each of the plurality of nodes.

3. The apparatus of claim 1, wherein the logic is to determine a separate policy for at least a portion of each of the plurality of nodes.

4. The apparatus of claim 1, wherein the one or more objective functions are to further comprise one or more of: maximize performance while meeting a power cap, maximize energy efficiency while meeting a power cap, maximize performance, or maximize efficiency, or maximize performance and maximize efficiency while meeting a power cap.

5. The apparatus of claim 1, wherein the logic is to perform one or more operations to solve one or more of: a load imbalance problem, a scalability problem, or a flexibility problem.

6. The apparatus of claim 1, wherein the policy is to coordinate power and performance management across all nodes that are to execute the job.

7. The apparatus of claim 1, wherein the policy is to coordinate power and performance management across all nodes that are to execute the job and across software and hardware abstraction layers.

8. The apparatus of claim 1, wherein the logic is to determine the policy in accordance with a stochastic policy gradients technique.

9. The apparatus of claim 1, further comprising a scalable overlay network to couple the plurality of nodes.

10. The apparatus of claim 1, further comprising a scalable overlay network to couple the plurality of nodes, wherein the scalable overlay network is to provide aggregation of power or performance telemetry and dissemination of control.

11. The apparatus of claim 1, wherein a System On Chip (SOC) integrated circuit is to comprise the logic and memory.

12. The apparatus of claim 1, wherein each node of the plurality of nodes is to comprise one or more of: a processor, having one or more processor cores, a graphics processing unit, having one or more processor cores, a connection to a network fabric, a log in component, a service component, memory, or an input/output device.

13. The apparatus of claim 1, wherein the logic is to perform one or more operations to solve a plurality of problems consisting of: a load imbalance problem, a scalability problem, and a flexibility problem.

14. A method comprising:
causing, at logic, determination of a policy for power and performance management for each node of a plurality of nodes; and
transmitting the policy to the plurality of nodes,
wherein the policy causes coordination of power and performance management across the plurality of nodes, wherein the policy manages a job to one or more objective functions, wherein non-uniform power caps are applied for each of plurality of nodes, wherein the logic operates in accordance with hierarchical machine learning operations, wherein the plurality of nodes form a cabinet, wherein the policy is decomposed hierarchically among one or more cabinets and then among the plurality of nodes that are to execute the job.

15. The method of claim 14, further comprising determining a separate policy for each of the plurality of nodes.

16. The method of claim 14, further comprising determining a separate policy for at least a portion of each of the plurality of nodes.

17. The method of claim 14, wherein the one or more objective functions further comprise one or more of: maximize performance while meeting a power cap, maximize energy efficiency while meeting a power cap, maximize performance, or maximize efficiency, or maximize performance and maximize efficiency while meeting a power cap.

18. A non-transitory computer-readable medium comprising one or more instructions that when executed on a processor configure the processor to perform one or more operations to:
cause, at logic, determination of a policy for power and performance management for each node of a plurality of nodes; and
transmit the policy to the plurality of nodes,
wherein the policy causes coordination of power and performance management across the plurality of nodes, wherein the policy manages a job to one or more objective functions, wherein non-uniform power caps are applied for each of plurality of nodes, wherein the logic is to operate in accordance with hierarchical machine learning operations, wherein the plurality of nodes is to form a cabinet, wherein the policy is decomposed hierarchically among one or more cabinets and then among the plurality of nodes that are to execute the job.

19. The non-transitory computer-readable medium of claim 18, further comprising one or more instructions that when executed on the processor configure the processor to perform one or more operations to cause determination of a separate policy for each of the plurality of nodes.

20. The non-transitory computer-readable medium of claim 18, further comprising one or more instructions that when executed on the processor configure the processor to perform one or more operations to cause determination of a separate policy for at least a portion of each of the plurality of nodes.

* * * * *